United States Patent Office 3,425,965
Patented Feb. 4, 1969

3,425,965
METHOD OF PRODUCING COLLAPSED EXPANDABLE CELLULAR CHLOROSTYRENE POLYMER PRODUCT
Richard E. Skochdopole, Midland, and Keith R. Denslow, Coleman, Mich., assignors to The Dow Chemical Company, Midland, Mich., a corporation of Delaware
No Drawing. Filed Nov. 16, 1964, Ser. No. 411,601
U.S. Cl. 260—2.5                                4 Claims
Int. Cl. C08f 7/06, 47/00

ABSTRACT OF THE DISCLOSURE

Re-expandable chlorostyrene polymer particles are prepared by foaming at superatmospheric pressure, cooling the particles to about room temperature, causing partial collapse of the cell wall. Such particles are re-expanded by exposing to air under ambient conditions.

This invention relates to the production of an improved collapsed expandable cellular thermoplastic product. It more particularly relates to an expandable cellular product comprising a polymer of chlorostyrene.

Partially collapsed thermoplastic resinous bodies may be prepared by heating an expandable thermoplastic resinous substance containing a volatile blowing agent to a temperature sufficiently high to heat plastify the resinous material, cause the expanding agent to expand and form a plurality of cells. If such an operation is carried out under reduced pressure, very low density products are obtained such as those having densities of from about 0.3 pound per cubic foot to about 1 pound per cubic foot. When such bodies are cooled below their thermoplastic temperature and then subjected to atmospheric pressure the bodies collapse to a volume substantially below that of their volume under reduced pressure. In certain instances a quantity of the volatile blowing agent remains in the cells but the quantity is insufficient to cause immediate expansion thereof. If the particle remains in an atmosphere which has a diffusion rate into the cell greater than the diffusion rate of the blowing agent out of the cell the body will slowly re-expand to a volume about the volume at maximum expansion. Generally for many applications it is undesirable to utilize pressures less than atmospheric because of the inconvenience, cost, and hazards of employing vessels which operate at a pressure differential.

It is therefore an object of this invention to provide an improved method for the preparation of partially collapsed expandable cellular chlorostyrene polymer bodies.

A further object of this invention is to provide a method for the preparation of partially collapsed expandable chlorostyrene bodies without subjecting the particles to a reduced pressure.

A further object of the invention is to provide a method of preparing expandable collapsed cellular chlorostyrene polymer bodies utilizing readily available equipment.

These benefits and other advantages in accordance with the present invention are achieved by heating a chlorostyrene polymer body containing a volatile fluid foaming agent to a temperature sufficient to heat plastify the body and cause it to expand and form a plurality of individual cells therein, subsequently subjecting the expanded body to steam at a pressure of about 5 to about 100 pounds per square inch gauge for a period of time sufficient to cause expansion greater than the maximum expansion obtained in hot air, subsequently cooling the body to a temperature below the thermoplastic temperature, thereby causing the body to collapse to a volume of less than about 60 percent of the maximum expanded volume of the body under steam pressure.

By the term "chlorostyrene" is meant a member selected from the group consisting of 2-chlorostyrene, 3-chlorostyrene, 4-chlorostyrene, 2,3-dichlorostyrene, 2,5-dichlorostyrene, 2,4-dichlorostyrene, 3,4-dichlorostyrene, 3,5-dichlorostyrene, and mixtures thereof.

The chlorostyrene polymer bodies contemplated within the scope of the present invention are thermoplastic resinous polymers which contain in chemically combined form at least about 90 weight percent based on the total weight of the polymer of a chlorostyrene and any balance being another ethylenically unsaturated monomeric material copolymerizable with the chlorostyrene, such as acrylonitrile, methyl methacrylate, methyl acrylate, styrene, vinyl acetate, ethyl styrene, and the like.

The blowing agents employed for the expandable thermoplastic resinous material may be any of those which are commercially utilized for such purposes, including such fugacious materials as dichlorodifluoromethane, monochlorotrifluoromethane, pentane and other low boiling hydracarbons, halocarbons alone or in conjunction with, and other suitable materials such as heat-sensitive gas generating agents (liquid or solid) including those which, upon thermal decomposition, generate nitrogen, carbon dioxide, etc. and the like. As is apparent the expandable resinous materials are prepared with conventional quantities of the particular blowing agent involved, depending upon the amount of the specific propellant substance that may be necessary for a given thermoplastic to accomplish efficient foaming action upon application of heat to the expandable mass. Thus, between about 1 and 15 weight percent or so of such fugacious materials as dichlorodifluoromethane, carbon dioxide or pentane may be employed. The fugacious or gaseous blowing agents may be incorporated into the thermoplastic material by any technique suitable for the purpose; including such known procedures as pressing a volatile or gaseous blowing agent under appropriate conditions of temperature and pressure into an already prepared thermoplastic material desired to be rendered expandable or, alternatively, by including certain of such agents in the polymerization mass in which the thermoplastic polymer is prepared so as to thereby incorporate efficient amounts of the blowing agent in the polymer and directly provide an expandable product.

The particles in accordance with the present invention solve a difficult problem in the field of insulation and filling of cavities and are found useful in other areas such a packaging of a rocket and complex parts. Generally the maximum pressure exerted by the particles while expanding is in the order of 1 pound per square inch. Thus relatively delicate and fragile structures may be placed in a container with the expandable particles and the particles slowly expand and support the article in a relatively uniform manner and maintain it in spaced relationship from the sides of the container. Articles which beneficially are packaged employing this technique include electrical instruments such as meters, tubes, or valves, electronic assemblies, and the like. Glass articles both of the decorative and utilitarian variety as well as mechanical movements which are subject to damage, benefit from such packaging. As the particles expand without adhering together or to the article being packaged, upon opening one of the containers, the expanded foam particles are readily removed and the packaged article extracted therefrom. Generally with most surfaces which are not adhesive and do not chemically attack the thermoplastic resinous particles, no tendency for adhesion is observed and the article can be removed and is substantially contaminatefree thus eliminating the need for an overwrap which is often employed with conventional packing material and even with molded plastic foam packages.

Example 1

A mixture of 93.86 weight percent orthochlorostyrene, 0.04 weight percent divinylbenzene and 7.7 weight percent isopentane was suspension polymerized to expandable beads having diameters that passed a 12 mesh screen and were retained on an 18 mesh screen. The mesh sizes are U.S. Standard Sieve sizes. The expandable beads were analyzed and found to contain 6.1 percent isopentane. Beads from this polymerization were subjected to steam at various temperatures for various lengths of time. The foam volume expressed is milliliters per gram was determined at the end of the designated period and again at the end of 14 days under ambient atmospheric pressure and temperature. The temperature range is generally from 20–25° centigrade. The results are set forth in Tables 1 and 2.

TABLE 1

| Bead Sample | Steam Pressure (p.s.i.g.) | Steaming Time (minutes) | Foam Volume (cc./g.) Immediate | Foam Volume (cc./g.) 14 days | Ratio, Vf/Vi |
|---|---|---|---|---|---|
| 0-1 | 6 | 1 | 14 | 11 | 0.79 |
| 0-1 | 6 | 2 | 10.5 | 14.5 | 1.38 |
| 0-1 | 6 | 5 | 14.5 | 18 | 1.24 |
| 0-1 | 16 | 1 | 14.5 | 15.5 | 1.06 |
| 0-1 | 16 | 3 | 24 | 24 | 1.00 |
| 0-1 | 16 | 5 | 27.5 | 31.5 | 1.15 |
| 0-1 | 24 | 1 | 22.5 | 24 | 1.07 |
| 0-1 | 24 | 3 | 36 | 42 | 1.17 |
| 0-1 | 24 | 5 | 50 | 55.5 | 1.11 |
| 0-1 | 38 | 1 | 47 | 55 | 1.17 |
| 0-1 | 38 | 3 | 44 | 108 | 2.45 |
| 0-1 | 38 | 5 | 38.5 | 131 | 3.40 |
| 0-1 | 44 | 1 | 56 | 77 | 1.38 |
| 0-1 | 54 | 1 | 40 | 114 | 2.85 |
| 0-1 | 54 | 3 | 35 | 153.5 | 4.39 |
| 0-1 | 54 | 5 | 40.5 | 109 | 2.69 |
| 0-1 | 73 | 1 | 38.5 | 66.5 | 1.73 |
| 0-1 | 73 | 2 | 50 | 130 | 2.60 |
| 0-1 | 73 | 5 | 62.5 | --- | --- |
| 0-1 | 100 | 1 | 59 | 71 | 1.20 |
| 0-1 | 100 | 2 | 60 | 61 | 1.02 |
| 0-1 | 100 | 5 | 59 | 56 | 0.95 |

TABLE 2

| Bead Sample | Steam Pressure | Steaming Time | Foam Volume (cc./g.) Immed. | 0.83 days | 7 days | 14 days | 68 days | Ratio, Vf/Vi |
|---|---|---|---|---|---|---|---|---|
| 0-1 | 40 | 1 | 42.5 | 47 | 52 | 57 | 54 | 1.27 |
| 0-1 | 40 | 2 | 46 | 64 | 85 | 90 | 93 | 2.02 |
| 0-1 | 40 | 3 | 40 | 78 | 110 | 112 | 110 | 2.75 |
| 0-1 | 42 | 1 | 60 | 64 | 76 | 76 | 81 | 1.35 |
| 0-1 | 42 | 2 | 43 | 75 | 100 | 105 | 108 | 2.51 |
| 0-1 | 42 | 3 | 37 | 86 | 115 | 118 | 125 | 3.38 |
| 0-1 | 44 | 1 | 59 | 69 | 74 | 79 | 84 | 1.42 |
| 0-1 | 44 | 2 | 46 | 80 | 103 | 103 | 116 | 2.52 |
| 0-1 | 44 | 3 | 42 | 92 | 136 | 142 | 147 | 3.50 |
| 0-1 | 46 | 1 | 59 | 69 | 79 | 82 | 87 | 1.47 |
| 0-1 | 46 | 2 | 44 | 88 | 124 | 126 | 131 | 2.98 |
| 0-1 | 46 | 3 | 46 | 97 | 142 | 142 | 148 | 3.22 |
| 0-1 | 48 | 1 | 50 | 68 | 89 | 94 | 97 | 1.43 |
| 0-1 | 48 | 2 | 39 | 88 | 135 | 143 | 141 | 3.62 |
| 0-1 | 48 | 3 | 40 | 101 | 170 | 170 | 164 | 4.10 |
| 0-1 | 50 | 1 | 44 | 71 | 102 | 105 | 108 | 2.45 |
| 0-1 | 50 | 2 | 40 | 100 | 137 | 140 | 142 | 3.55 |
| 0-1 | 50 | 3 | 35 | 104 | 131 | 128 | 126 | 3.60 |
| 0-1 | 73 | 1 | 35 | 125 | 134 | 134 | 137 | 3.91 |
| 0-1 | 73 | 2 | 34 | 85 | 88 | 85 | 88 | 2.59 |
| 0-1 | 73 | 5 | 49 | 55 | 58 | 49 | 58 | 1.18 |
| 0-1 | 24 | 5 | 42 | 45 | 52 | 50 | 55 | 1.31 |
| 0-1 | 24 | 10 | 53 | --- | 71 | 74 | 79 | 1.49 |
| 0-1 | 24 | 20 | 49 | 74 | 83 | 87 | 90 | 1.84 |
| 0-1 | 28 | 5 | 56 | 66 | 68 | 68 | 73 | 1.30 |
| 0-1 | 28 | 10 | 44 | 85 | 91 | 96 | 96 | 2.18 |
| 0-1 | 28 | 20 | 42 | 111 | 117 | 117 | 125 | 2.98 |
| 0-1 | 32 | 5 | 41 | 98 | 106 | 114 | 114 | 2.78 |
| 0-1 | 32 | 10 | 36 | 114 | 121 | 124 | 126 | 3.50 |
| 0-1 | 32 | 20 | 51 | 145 | 151 | 136 | 143 | 2.80 |

In a manner similar to the foregoing examples, other re-expandable particles are readily prepared employing poly-3-dichlorostyrene, poly-4-dichlorostyrene, poly-2,3-dichlorostyrene, poly-2,4-dichlorostyrene, poly-2,5-dichlorostyrene, a copolymer comprising 10 weight percent 2-chlorostyrene, 90 weight percent 2,5-dichlorostyrene, a copolymer comprising 30 weight percent 4-chlorostyrene, 20 weight percent 3-chlorostyrene and 50 weight percent 2,3-dichlorostyrene, and a copolymer of 50 weight percent 4-chlorostyrene, and 50 weight percent 2,4-chlorostyrene. When blowing agents including monochlorotrifluoromethane, isopentane, pentane, and dichlorodifluoromethane and mixtures thereof are used, commensurate beneficial results are obtained.

As is apparent from the foregoing specification, the method and article of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of preparing a partially collapsed expandable cellular synthetic resinous body, the body being expandable by exposure to air under atmospheric pressure to a volume approximating its original volume, the steps of the method comprising heating a particulate chlorostyrene polymer body containing a volatile expanding agent to a temperature sufficient to heat plastify the body and cause it to expand to form a plurality of individual cells therein, subjecting the body to steam at a pressure of from about 6 to about 100 pounds per square inch gauge for a period of time sufficient to cause expansion greater than that obtained in hot air at atmospheric pressure with like temperature and time, subsequently cooling the body to an ambient temperature below the thermoplastic temperature, exposing the body to atmospheric pressure, thereby causing the body to collapse to a volume of less than about 60 percent of the maximum expanded volume of the particle under steam pressure.

2. The method of claim 1 wherein the resinous body consists essentially of a polymer which contains in chemically combined form at least about 90 weight percent based on the total weight of the polymer of a chlorostyrene and selected from the group consisting of 2-chlorostyrene, 3-chlorostyrene, 4-chlorostyrene, 2,3-dichlorostyrene, 2,5-dichlorostyrene, 2,4-dichlorostyrene, 3,4-dichlorostyrene, 3,5-dichlorostyrene, and mixtures thereof, and any balance being another ethylenically unsaturated monomeric material copolymerizable therewith.

3. The method of claim 1 wherein the polymer contains a major amount of ortho-chlorostyrene copolymerized therein.

4. The method of claim 1 including the step of expanding the particle to a volume approximating the originally expanded volume of the particle by exposing to air at a temperature of from about 5° to 35° centigrade.

References Cited

UNITED STATES PATENTS 3,359,353  12/1967  Odd _____ 264—321
2,860,378  11/1958  Urchick _____ 260—2.5
2,986,537  5/1961   Chaumeton _____ 260—2.5

SAMUEL H. BLECH, *Primary Examiner.*

W. J. BRIGGS, SR., *Assistant Examiner*

U.S. Cl. X.R.

264—55, 321